(12) United States Patent
Campbell et al.

(10) Patent No.: US 6,265,511 B1
(45) Date of Patent: Jul. 24, 2001

(54) HYPERBRANCHED POLYMERS

(75) Inventors: J. David Campbell, Racine, WI (US); Fouad Teymour, Mt. Prospect, IL (US)

(73) Assignee: S. C. Johnson Commerical Markets, Inc., Sturtevant, WI (US)

( * ) Notice: Subject to any disclaimer, the term of this patent is extended or adjusted under 35 U.S.C. 154(b) by 0 days.

(21) Appl. No.: 09/389,821

(22) Filed: Sep. 3, 1999

Related U.S. Application Data

(62) Division of application No. 08/906,140, filed on Aug. 5, 1997, now Pat. No. 5,986,020.

(51) Int. Cl.[7] ............................ C08F 212/34; C08F 212/36
(52) U.S. Cl. ............................ 526/336; 526/335; 526/338; 526/337; 526/339; 526/340; 526/347; 526/347.1; 526/319; 526/320; 526/321; 526/324; 526/325; 526/326
(58) Field of Search ................................ 526/335, 336, 526/337, 338, 339, 340, 340.2, 340.3, 347, 347.1, 319, 320, 321, 324, 325, 326

(56) References Cited

U.S. PATENT DOCUMENTS

| | | | |
|---|---|---|---|
| 4,338,404 | 7/1982 | Tanaka et al. | 521/52 |
| 4,414,370 | 11/1983 | Hamielec et al. | 526/88 |
| 5,414,062 | 5/1995 | Lundquist et al. | 526/74 |
| 5,484,866 | 1/1996 | Loveless et al. | 526/340 |
| 5,508,366 | 4/1996 | Andrist et al. | 526/320 |
| 5,539,075 | * 7/1996 | Gustafsson et al. | 526/339 |
| 5,556,932 | * 9/1996 | Rath et al. | 526/339 |
| 5,578,743 | * 11/1996 | Ho et al. | 585/530 |
| 5,587,446 | 12/1996 | Frecht et al. | 526/333 |
| 5,631,329 | 5/1997 | Yin et al. | 525/417 |
| 5,767,211 | * 6/1998 | Guan | 526/171 |

FOREIGN PATENT DOCUMENTS

3026831 * 2/1982 (DE) .

OTHER PUBLICATIONS

DeLassus, "Incorporation of Benzocyclobutene into Polystyrene Allowing Postpolymerizer Chain Extension/Branching", *Macromolecules* 1994, vol. 27, pp. 1307–1312.

Haimelec, "Polymerization Processes," Ullmann's Encyclopedia of Industrial Chemistry, vol. A21, 5th Ed., 1992.

* cited by examiner

Primary Examiner—David W. Wu
Assistant Examiner—R. Rabago
(74) Attorney, Agent, or Firm—Renee J. Rymarz; Neil E. Hamilton; Warren R. Bovee

(57) ABSTRACT

A method is provided for producing hyperbranched polymers comprising heating a polymerizable reaction charge comprising (a) a monomer mixture comprising 50–99.1% by weight of at least one monoethylenically unsaturated monomer and 0.1–50% by weight of one or more multiethylenically unsaturated monomers and (b) if at least one ethylenically unsaturated monomer of the monomer mixture is not a thermally initiating monomer, a free radical polymerization initiator, to a temperature in the range from about 250° C. to about 400° C. in a continuous reactor which allows mixing of the reactor contents for a residence time of from about 2 minutes to about 60 minutes, provided that if the total amount of multiethylenically unsaturated monomer is less than 3% by weight of the monomer mixture than at least one of said one or more multiethylenically unsaturated monomers must be tri- or greater ethylenically unsaturated. The hyperbranched polymers prepared by this process are also described.

18 Claims, 3 Drawing Sheets

HYPERBRANCHED POLYMERS

CROSS REFERENCES TO RELATED APPLICATIONS

This is a divisional application of U.S. Ser. No. 08/906,140, filed on Aug. 5, 1997 and now U.S. Pat. No. 5,986,020, the benefit of which is now claimed for purposes of priority pursuant to 35 U.S.C. section 120.

BACKGROUND OF THE INVENTION

1. Field of the Invention

This invention relates to a process for producing hyperbranched polymers. Monoethylenically unsaturated monomers are polymerized along with at least one multiethylenically unsaturated monomer at high temperatures, preferably in the substantial absence of initiators. This invention also relates to the hyperbranched polymers produced according to this method.

2. Related Background Art

Hyperbranched polymers are materials consisting of highly branched polymer chains. These branched chains often contain a large number of reactive groups which may be useful for further reactions to produce a finished product. An important property of hyperbranched polymers is their low viscosity relative to less highly branched polymers of similar molecular weight. In solvent-based systems, used to produce finished products such as coatings, use of high-molecular-weight polymers leads to undesirably high viscosity. This high viscosity may be counteracted by lowering the molecular weight of the polymer, but this may result in a finished product with inferior properties. Another means for reducing viscosity is to increase the solvent content of the system. Such an increase may be in conflict with growing environmental regulation of volatile organic compounds (VOC), such as solvents. When a hyperbranched polymer is dispersed in a solvent, the relatively low viscosity of hyperbranched polymers actually allows the solvent content of the dispersion to be decreased in order to comply with environmental requirements for low VOC content. Another important property of hyperbranched polymers is the increased durability of articles manufactured from hyperbranched polymeric resins.

Hyperbranched polymers may be classified as either dendrimers or random hyperbranched polymers. Dendrimers originate from a central location, with branching occurring as the polymer grows outward, leading to structures of relatively high symmetry. Tight control of reaction conditions and stoichiometry is required to produce dendrimers. Random hyperbranched polymers are more readily accessible from standard polymerization reactions. However, the methods employed for production of random hyperbranched polymers usually entail a separate post-polymerization step of reacting functional groups present on different polymer chains to create the branches.

Post-polymerization branching is utilized to produce hyperbranched polymers in DeLassus, S. L., et al., Macromolecules, Vol. 27, page 1307 (1994). The method of this reference employs benzocyclobutenoyl peroxide as an initiator for polymerization of styrene, and heats the resulting styrenic polymer to a high temperature in a separate step, causing the benzocyclobutene groups on different polymer chains to react. This method is limited by the use of a particular initiator and the requirement of an additional step after the initial polymerization. This reference acknowledges that attempts to make branched polystyrene in a continuous process typically lead to gel formation.

Thermally-initiated polymerization, in which a free-radical polymerization process is initiated by heating rather than by addition of initiators, has been used to prepare low molecular weight polymers from ethylenically unsaturated monomers. U.S. Pat. No. 4,414,370 describes a thermally-initiated polymerization process for preparing low molecular weight polymers in a continuous reactor, at temperatures from 235° C. to 310° C., with a residence time of about 2 minutes. This reference teaches that use of temperatures above 310° C. leads to adverse effects on the products, for example, discoloration, oxidation, depolymerization, and side reactions. Further, this reference describes the use of a monomer mixture containing only monoethylenically unsaturated monomers, and no multifunctional monomers.

Hyperbranching in polymers formed by thermally initiated free radical polymerization may be achieved by introducing multiethylenically unsaturated monomers into a mixture of monoethylenically unsaturated monomers. This often leads to formation of highly crosslinked gels, particularly when high local concentrations of the multiethylenically unsaturated monomers form on surfaces during the polymerization reaction. These high local concentrations typically form when the multiethylenically unsaturated monomers condense on the reactor walls and on the surface of the reaction mixture. German Patent Application DE 3,026,831 describes a thermal initiation method for preparation of copolymers based on vinyl aromatics and ethylenically unsaturated carboxylic acids in which pressure pulses are applied to the reactor to remove reactants from the reactor walls, thereby minimizing gel formation. Although this reference describes preparation of polymers without gel formation using this technique, the monomer mixtures which are polymerized contain at most 1% or 2% divinyldioxane. Systems containing higher levels of diethylenically unsaturated monomer are not exemplified. At high levels of diethylenically unsaturated monomers, gelation in the bulk of the reaction mixture can also occur. Significant levels of gel in the bulk of the reaction mixture will limit both processability and solubility of the product. In addition, the polymerization reactions in this reference are carried out at temperatures between 250° C. and 285° C. Polymerization reactions run at temperatures higher than 285° C. are not disclosed.

Preparation of hyperbranched polymers from difunctional monomers is also described in U.S. Pat. No. 5,587,446. However, in this reference the polymerization is carried out by means of a "living polymer" formed by a cationic or anionic mechanism.

This is disadvantageous because monomers used for cationic or anionic polymerization must be more highly purified than those used for free radical polymerization. Consequently, most commercial polymerization of vinyl monomers is carried out using free radical polymerization. Production of a highly branched soluble polymer by a cost-effective free radical polymerization process has not been reported in the literature.

A method for prevention of gel formation in continuous free radical polymerization, by addition of solvents to the reaction mixture, is described in U.S. Pat. No. 5,508,366. This method is limited to use in reaction mixtures containing an ethylenically unsaturated monomer with at least one free hydroxyl group and an ethylenically unsaturated carboxylic acid monomer. In addition, for many applications, the solvent must be removed from the product, necessitating additional processing steps.

Continuous stirred tank reactors (CSTR) are used in commercial polymerization reactions. However, in Hamielec, A. E. and Tobita, H., "Polymerization Processes", Ullmann's Encyclopedia of Industrial Chemistry, Vol. A21, 5th Ed. (1992), it is stated that the CSTR gives more crosslinking and gel formation in free-radical polymerization than either batch reactors or continuous plug-flow reactors.

A method applicable to producing a variety of hyperbranched polymers by means of a single step consisting of free radical polymerization in a continuous reactor, without formation of highly crosslinked gels would be highly desirable.

SUMMARY OF THE INVENTION

A method is provided for producing hyperbranched polymers comprising heating a polymerizable reaction charge comprising (a) a monomer mixture comprising (i) at least one monoethylenically unsaturated monomer in an amount of about 50–99.9% by weight of the monomer mixture and (ii) one or more multiethylenically unsaturated monomers in an amount of about 0.1–50% by weight of the monomer mixture, and (b) if at least one ethylenically unsaturated monomer of said monomer mixture is not a thermally initiating monomer, a free radical polymerization initiator, to a temperature in the range from about 250° C. to about 400° C. in a continuous reactor which allows mixing of the reactor contents for a residence time of from about 2 minutes to about 60 minutes, provided that if the total amount of multiethylenically unsaturated monomer is less than 3% by weight of the monomer mixture then at least one of said one or more multiethylenically unsaturated monomers must be tri- or greater ethylenically unsaturated. Preferably, the multiethylenically unsaturated monomer is selected from the group consisting of diethylenically unsaturated monomers, triethylenically unsaturated monomers, tetraethylenically unsaturated monomers or mixtures thereof.

DETAILED DESCRIPTION OF THE INVENTION

Figure 1:
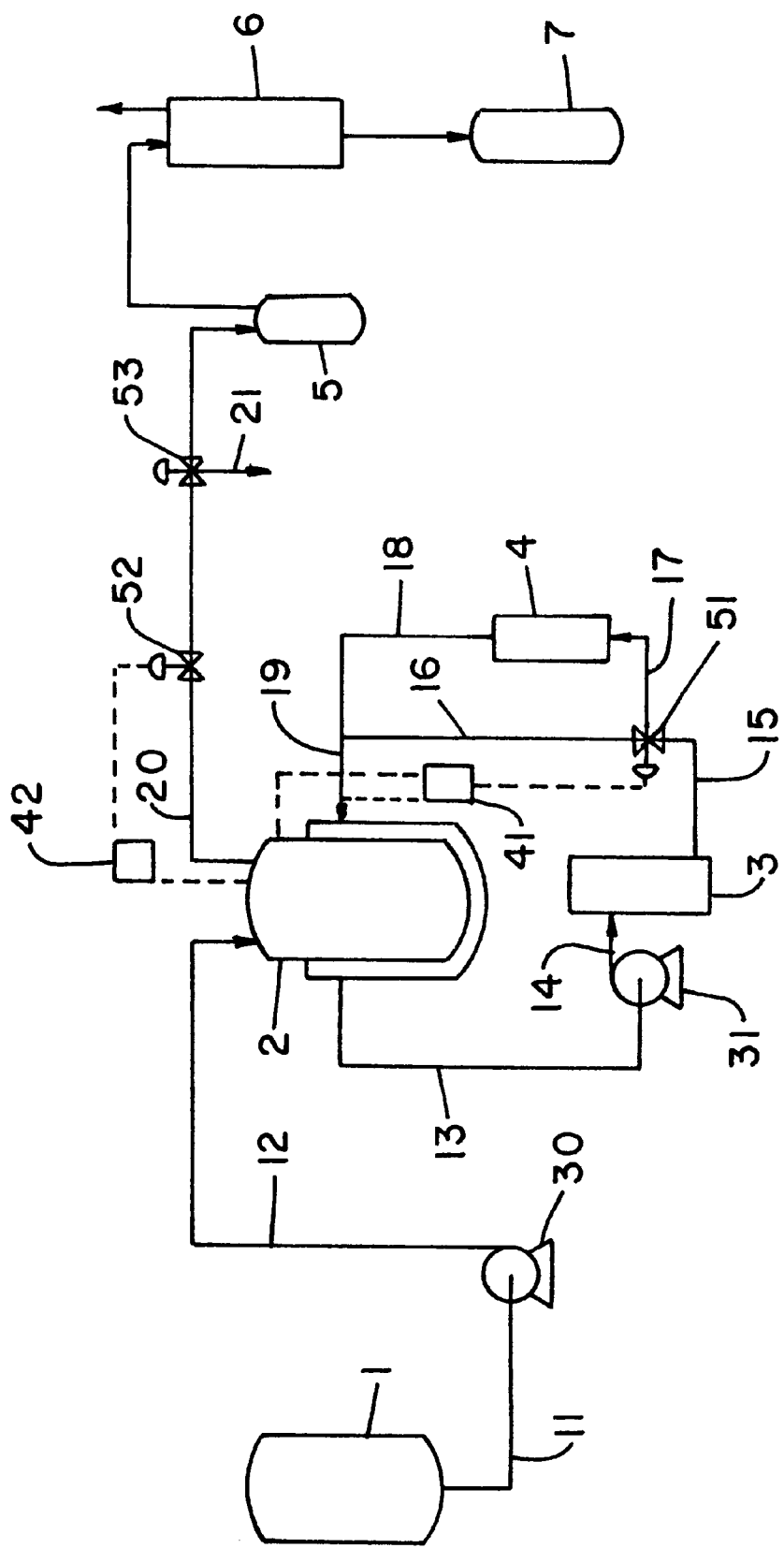
FIG. 1 is a schematic diagram showing the reactor and support equipment used in a preferred embodiment of this invention.

The hyperbranched polymers of this invention may be characterized by parameters well known to those skilled in the art: number average molecular weight ($M_n$), weight average molecular weight ($M_w$), polydispersity (PD), and double bonds per chain (DB/chain). The term "repeat unit" refers to a portion of a polymer chain derived from a single molecule of monomer. A divinylic repeat unit is a repeat unit derived from a diethylenically unsaturated monomer. PD is defined in the conventional way as $M_w/M_n$. DB/chain is defined in terms of the double bond equivalent weight DBEQ (iodine number) as $M_n$/DBEQ.

The preferred range for $M_n$ for polymers of this invention is from about 300 to about 10,000, and the most preferred range is from about 300 to about 5000.

The polymers of this invention are produced from a monoethylenically unsaturated monomer or a mixture of monoethylenically unsaturated monomers, and varying amounts of at least one monomer which is multiethylenically unsaturated. Examples of monoethylenically unsaturated monomers suitable for use in this method include, but are not limited to styrene, α-methylstyrene, vinyl toluene, 4-methylstyrene, tert-butylstyrene, 2-chlorostyrene, vinylpyridine, vinylpyrrolidone, maleic anhydride, methyl crotonoate, sodium crotonoate, acrylic acid and its salts, methyl acrylate, ethyl acrylate, propyl acrylate, isopropyl acrylate, butyl acrylate, 2-ethylhexyl acrylate, decyl acrylate, hydroxyethyl acrylate, methacrylic acid and its salts, methyl methacrylate, ethyl methacrylate, propyl methacrylate, isopropyl methacrylate, butyl methacrylate, sec-butyl methacrylate, isobutyl methacrylate, n-amyl methacrylate, isoamyl methacrylate, n-hexyl methacrylate, tert-butyl methacrylate, 2-ethylhexyl methacrylate, n-octyl methacrylate, methallyl methacrylate, phenyl methacrylate, benzyl methacrylate, allyl methacrylate, cyclohexyl methacrylate, 2-hydroxyethyl methacrylate, 2-hydroxypropyl methacrylate, N,N-dimethylaminoethyl methacrylate, N,N-diethylaminoethyl methacrylate, tert-butylaminoethyl methacrylate, 2-sulfoethyl methacrylate, trifluoroethyl methacrylate, glycidyl methacrylate, 2-n-butoxyethyl methacrylate, 2-chloroethyl methacrylate, 2-ethylbutyl methacrylate, cinnamyl methacrylate, cyclopentyl methacrylate, 2-ethoxyethyl methacrylate, furfuryl methacrylate, hexafluoroisopropyl methacrylate, 3-methoxybutyl methacrylate, 2-methoxybutyl methacrylate, 2-nitro-2-methylpropyl methacrylate, 2-phenoxyethyl methacrylate, 2-phenylethyl methacrylate, propargyl methacrylate, tetrahydrofurfuryl methacrylate, tetrahydropyranyl methacrylate, methacrylamide, N-methylmethacrylamide, N-ethylmethacrylamide, N,N-diethylmethacrylamide, N,N-dimethylmethacrylamide, N-phenylmethacrylamide, acrylamide, N,N-diethylacrylamide, N-ethylacrylamide, methyl 2-cyanoacrylate, methyl alpha-chloroacrylate, methacrolein, acrolein, methacrylonitrile and acrylonitrile. Preferred monoethylenically unsaturated monomers are styrene, α-methylstyrene, acrylic acid, methacrylic acid, methyl methacrylate; butyl acrylate, butyl methacrylate, hydroxyethyl methacrylate, hydroxypropyl methacrylate, and hydroxypropyl acrylate.

Examples of diethylenically unsaturated monomers suitable for use in this invention include, but are not limited to divinylbenzene, bis-(4-ethenylphenyl)methane, divinyldioxane, divinyl ether, 1,4-butanediol divinyl ether, hexanediol divinyl ether, cyclohexanediol divinyl ether, ethylene glycol divinyl ether, diethylene glycol divinyl ether, cyclohexanedimethanol divinyl ether, 1,3-divinyl-1,1,3,3-tetramethyldisilazane, divinyl 1,3-diphenyl-1,3-dimethyldisilazane, divinyl tetraethoxy-1,3-disilazane, divinyl tetramethoxy-1,3-disilazane, divinyl 1,3-diphenyl-1,3-dimethyl-1,3-disiloxane, divinylacetylene, N,N-divinylaniline, divinylcarbinol, divinylcarbonate, 1,2-divinylcyclobutane, cis-1,2-divinylcyclohexane, trans-1,2-divinylcyclohexane, 1,4-divinylcyclohexanedimethanol diether, divinyldibutyltin, 2,5-divinyldioxane, 1,1'-divinylferrocene, divinylformal, divinyl glycol, 1,4-divinylperfluorobutane, 1,6-divinylperfluorohexane, divinylphenylphosphine, 3,9-divinylspirobim-dioxane, divinylsulfone, 1,4-divinyl-1,1,4,4-tetramethyldisilylethylene, divinyl tin dichloride, divinyl triethylene glycol diether, 1,5-bis-divinyloxy-3-oxapentane, divinylsilane, divinyldiethoxysilane, divinyldimethylsilane, divinyldiphenylsilane, 1,1'-bis(2-vinyloxyethoxy)-4,4'-isopropylidene diphenol, ethylene glycol dimethacrylate, bisphenol A dimethacrylate, bisphenol A 2-hydroxyethyl dimethacrylate, 1,3-butylene glycol dimethacrylate, 1,4-butanediol dimethacrylate, butenediol dimethacrylate, 2-butyl-2-ethyl-1,3-propanediol dimethacrylate, 2-butyne-1,4-diyl dimethacrylate, 1,4-cyclohexanediol dimethacrylate, decamethylene glycol dimethacrylate, diethylene glycol dimethacrylate, 2,3-dihydroxypropyl dimethacrylate, 1,6-dimethylhexanediol dimethacrylate, 2,5-dimethylhexanediol dimethacrylate, dipropylene glycol dimethacrylate, diurethane dimethacrylate, 1,12-dodecanediol dimethacrylate, , ethylidene dimethacrylate, glycerol dimethacrylate, 1,5-tetrahydroperfluoropentyl dimethacrylate, hexafluorobisphenol A dimethacrylate, hexylene glycol dimethacrylate, hydrogenated bisphenol A dimethacrylate, methylene glycol dimethacrylate, neopentyl glycol dimethacrylate, 2,2,3,3,4,4,5,5-octafluorohexanediol 1,6-dimethacrylate, pentaerythritol dimethacrylate, 1,5-pentanediol dimethacrylate, perfluorocyclohexyl 1,4-dimethyl dimethacrylate, o-phenylene dimethacrylate, p-phenylene dimethacrylate, styrene glycol dimethacrylate, polyethylene glycol 600 dimethacrylate, polyethylene glycol 400 dimethacrylate, 1,2-propylene glycol dimethacrylate, propylene glycol dimethacrylate, sorbitol dimethacrylate, 4,4'-sulfonyl diphenol dimethacrylate, tetrabromo bisphenol A dimethacrylate, tetrachloro bisphenol A dimethacrylate, tetraethylene glycol dimethacrylate, 2,2,3,3-tetrafluorobutanediol dimethacrylate, triethylene glycol dimethacrylate, trimethyl pentanediol dimethacrylate, urethane dimethacrylate, zinc dimethacrylate, zirconium(IV) dimethacrylate, butanediol diacrylate, N,N-diacryloyl acrylamide, bisphenol A diacrylate, bisphenol A 2-hydroxyethyl diacrylate, 1,3-butylene glycol diacrylate, 1,4-butanediol diacrylate, 1,10-decanediol diacrylate, propoxylated neopentyl glycol diacrylate, ethoxylated bisphenol A diacrylate and dimethacrylate, ethylene glycol dimethacrylate, tetraethylene glycol diacrylate, tripropylene glycol dimethacrylate, diethyl 1,3-propanediol diacrylate, diethylene glycol diacrylate, dimethyl bisphenol A diacrylate, dipropylene glycol diacrylate, ethyl 1,3-hexanediol diacrylate, ethylene diacrylate, ethylidene diacrylate, hexafluorobisphenol A diacrylate, 1,6-hexanediol diacrylate, 2,5-hexanediol diacrylate, neopentyl glycol diacrylate, propoxylated neopentyl glycol diacrylate, 1,9-nonamethylene diacrylate, 2,2,3,3,4,4,5,5-octafluorohexanediol 1,6-diacrylate, 1,5-pentanediol diacrylate, p-phenylene diacrylate, polyethylene glycol 400 diacrylate, 1,2-propylene glycol diacrylate, propylene glycol diacrylate, sorbitol diacrylate, tetrabromobisphenol A diacrylate, polyethylene glycol 200 diacrylate, 2,2,3,3-tetrafluorobutanediol diacrylate, thiol diethylene glycol diacrylate, triethylene glycol diacrylate, tripropylene glycol diacrylate, urethane diacrylate, zinc diacrylate, diethylene glycol diacryloxypropionate, bis-acryloyl piperazine and diallyl maleate. A preferred diethylenically unsaturated monomer is divinylbenzene.

Examples of triethylenically unsaturated monomers suitable for use in this invention include, but are not limited to triacrylformal, pentaerythritol triallyl esters, glyceryl propoxy triacrylate, ferric triacrylate, pentaerythritol triacrylate, triazine-2,4,6-triyl-1,2-ethanediyl triacrylate, trimethylol ethane triacrylate, trimethylol propane triacrylate, ethoxylated trimethylol ethane triacrylate, ethoxylated trimethylol propane triacrylate, glycerol trimethacrylate, proproxylated glycerol triacrylate, pentaerythritol trimethacrylate, 1,2,5-pentanetriol trimethacrylate, triethanolamine trimethacrylate, trimethylol ethane trimethacrylate, trimethylol propane trimethacrylate, tris(2-hydroxyethyl) isocyanurate trimethacrylate.

Examples of tetraethylenically unsaturated monomers suitable for use in this invention include, but are not limited to pentaerythritol tetraacrylate, zirconium(IV) tetraacrylate, pentaerythritol tetramethacrylate, and zirconium(IV) tetramethacrylate.

The amount of monoethylenically unsaturated monomer in the monomer mixture is in the range from about 50% to about 99.1%, preferably about 50% to about 97%, by weight of the monomer mixture. More preferably, the amount of monoethylenically unsaturated monomer is in the range from about 70 wt. % to about 90 wt. %, and most preferably from 85 wt. % to 90 wt. % of the monomer mixture. The monomer mixture also includes from about 0.1% to about 50%, preferably 3% to about 50% by weight of the monomer mixture, of at least one multiethylenically unsaturated monomer, preferably selected from the group consisting of diethylenically unsaturated monomers, triethylenically unsaturated monomers, tetraethylenically unsaturated monomers or mixtures thereof. However, if the total amount of multiethylenically unsaturated monomer is less than 3% by weight of the monomer mixture, then at least one of the one or more multiethylenically unsaturated monomers must be tri- or greater ethylenically unsaturated, e.g., triethylenically or tetraethylenically unsaturated monomers. More preferably, the multiethylenically monomer component of the monomer mixture contains from about 10 wt. % to about 30 wt. % of a diethylenically unsaturated monomer, and most preferably from 10% to 15% of divinylbenzene.

The reaction temperature employed in the method of this invention is in the range from about 250° C. to about 400° C. The preferred reaction temperature is in the range from about 300° C. to about 350° C. The most preferred reaction temperature is in the range from 315° C. to 350° C.

Without being bound to theory, it is believed that at any given reaction temperature a decrease in radical concentration will favor polymer chain scission over chain termination, and thus will minimize the possibility of gellation. Consequently, it is preferred to operate at either reduced initiator levels or longer residence times. When employed, the initiators suitable for carrying out the process of this invention are compounds which decompose thermally into radicals. Suitable initiators preferably have half-life periods in the radical decomposition process from about 1 hour to about 10 hours in the temperature range from about 90° C. to about 100° C. Others with about 10 hour half-lives at temperatures significantly lower than 100° C. may also be used. Suitable initiators are, for example, aliphatic azo compounds such as 1-tert-amylazo-1-cyanocyclohexane, azo-bis-isobutyronitrile, and 1-tert-butylazocyanocyclohexane and peroxides and hydroperoxides, such as tert-butylperoctoate, tert-butylperbenzoate, dicumyl peroxide, di-tert-butyl peroxide, tert-butyl hydroperoxide, cumene hydroperoxide, and the like. The initiator is preferably added simultaneously with the monomers. For this purpose, it is either mixed with the monomer feed or added to the process as a separate feed.

Preferably, to further minimize gel formation, the polymerization reaction of this invention is carried out with the reactor as nearly full as possible. If the reactor is not full, gel formation is facilitated by condensation of monomers, especially diethylenically, triethylenically, and tetraethylenically unsaturated monomers, on the walls of the reactor above the surface and on the surface of the reaction mixture. The resulting high local concentrations of monomer may lead to formation of highly crosslinked gels which are difficult to remove from the reactor. Operating the reactor as full as possible minimizes the surface area available for condensation of monomers, and thus minimizes gel formation.

An alternative method for reducing gel formation is the addition of solvents to the monomer mixture. In a case where the monomer mixture contains an ethylenically unsaturated monomer with at least one free hydroxyl group and an ethylenically unsaturated carboxylic acid monomer, solvents may be added as described in U.S. Pat. No. 5,508,366, the specification of which is incorporated herein. For other monomer mixtures, suitable solvents to aid in reducing gel formation include n-hexane, toluene, propylene glycol monomethyl ether acetate (PMA), 2-ethyl-1-hexanol, 1-octanol, tripropylene glycol methyl ether, acetone, methyl iso-butyl carbinol, diethyleneglycol butyl ether, propylene glycol, tert-butyl ether, ethyl 3-ethoxypropionate, ethylene glycol monobutyl ether, ethylene glycol monomethyl ether acetate, 2-ethylhexyl acetate, diacetone alcohol, ethylene glycol 2-ethylhexyl ether, cyclohexanol, 2-ethyl-1-butanol, N-methyl-2-pyrrolidone (NMP), dipropylene glycol butyl ether, 2-methyl-1-butanol, 1-pentanol, diethylene glycol butyl ether acetate, diethylene glycol monomethyl ether, propylene glycol monobutyl ether, benzyl alcohol, 1-methoxy-2-butanol, propylene glycol propyl ether, 2-methyl-i-pentanol, diethylene glycol monoethyl ether, ethylene glycol hexyl ether, sec-butanol, tert-amyl alcohol, phenol, tert-butanol, tripropylene glycol, ethylene glycol diacetate, dipropylene glycol methyl ether n-butanol, furfuryl alcohol, isobutanol, diethylene glycol monoethyl ether acetate, ethylene glycol monoethyl ether, diethylene glycol monopropyl ether, isopropanol, tetraethylene glycol, ethylene glycol propyl ether, n-propanol, ethylene glycol methyl ether, propylene glycol propyl ether, tetrahydrofurfuryl alcohol, acetonitrile, 2-phenoxyethanol, dimethyl sulfoxide, hexylene glycol, allyl alcohol, 2-pyrrolidinone, ethanol, triethylene glycol, and methanol. The solvent will generally be chosen to provide adequate solvency of the polymer composition being prepared.

Other optional ingredients that are well known to those skilled in the art, e.g., chain transfer agents, surfactants and the like, may be included in the monomer mixture if desired.

The pressure of the reactor contents typically varies with the reaction temperature and the levels of various monomers and solvents. The pressure is not critical in the method of this invention.

Polymerization of monomer mixtures containing diethylenically unsaturated monomers is frequently associated with formation of insoluble gels. This occurs readily in a batch polymerization, e.g., one taking place in a flask or a batch reactor. The method of this invention is intended to be carried out in a continuous reactor. Suitable continuous reactors include those in which thorough mixing of the entire reactor contents occurs, e.g., any reactor or reactor configuration that approximates a continuous stirred tank reactor (CSTR) residence time distribution. However, continuous reactors in which this is not the case, e.g., plug flow reactors, facilitate gel formation and are not suitable. Examples of suitable continuous reactors are the continuous stirred tank reactor (CSTR) and the continuous loop reactor. In addition, a semi-batch reactor in which the monomer feeds are manipulated to simulate the concentrations of a CSTR could be used and for the purposes of this invention is considered a continuous reactor. The reactor is typically provided with at least one vaned agitator driven by an external power source, such as a motor, capable of mixing the reactor contents. The reactor is also provided with a means for controlling the temperature of the reactor contents, e.g., a reactor jacket in which a heating/cooling fluid circulates, controlled by a suitable temperature controller.

In the method of this invention, the mean residence time of the monomer mixture in the reactor is generally in the range from about 2 minutes to about 60 minutes. Preferably, the residence time is in the range from about 5 minutes to about 60 minutes, most preferably from 10 minutes to 60 minutes. As the concentration of multiethylenicallly unsaturated monomer in the monomer mixture and the reaction residence time increases, care should be taken to design the reactor system to avoid or mitigate lengthy residence times in the reactor feed tube. Such steps of avoidance or mitigation, e.g., increasing the scale of the reaction system, can be readily determined by those skilled in the art.

A schematic diagram of the reactor and support equipment used in a preferred embodiment of this invention is shown in FIG. 1. The 500 ml jacketed, stainless steel, continuous stirred tank reactor (CSTR) 2 is initially filled with solvent used to remove the product of the previous run. Monomer feed is passed into the CSTR from monomer feed tank 1 via piping 11, feed pump 30, and piping 12. The monomer feed is typically maintained at room temperature. However, in order to facilitate heat transfer in the reactor, the feed tank can be cooled, or the feed can be warmed while passing through the piping. The monomer feed enters the reaction mixture below the surface and in the vicinity of a magnetic drive agitator through a tube with an outside diameter of about 1/16 inch (0.16 cm). Preferably, a small flow of nitrogen is maintained on the agitator shaft to prevent polymer from migrating up the shaft. Hot oil circulates through the CSTR jacket to provide temperature control, exiting via piping 13, hot oil pump 31, piping 14, hot oil furnace 3, and piping 15. Temperature controller 41 monitors the temperatures of the reactor contents and the reactor jacket, and operates control valve 51 so as to maintain a predetermined reaction temperature by dividing flow of the heated oil through piping 16 and 19, and through piping 17, cooler 4, and piping 18 and 19 into the CSTR jacket. A portion of the reaction mixture exits the reactor from the top through piping 20, passing through control valve 52, which is operated by pressure controller 42 so as to maintain a predetermined pressure in the CSTR. Control valve 53 is operated to divert a small portion of the flow through piping 21 for sampling. The product collects in tank 5, and monomers and solvents are condensed by condenser 6 and collected in tank 7.

INDUSTRIAL APPLICABILITY

Yet another embodiment of this invention is related to a hyperbranched polymer prepared by the process described above. The polymers of this invention may be readily employed to form effective coating compositions.

The examples which follow are intended as an illustration of certain preferred embodiments of the invention, and no limitation of the invention is implied.

EXAMPLE 1

Polystyrene containing various levels of divinylbenzene (DVB) was polymerized at various temperatures using the equipment described in FIG. 1. In all cases, the reactor was operated with a 15 minute average reactor residence time. The process was kept at a steady state condition for at least 4 residence times before sampling. The number average molecular weight ($M_n$), the weight average molecular weight ($M_w$), the polydispersity (PD), and the DB/chain are displayed in Tables 1, 2, 3, and 4 for reactions run at 302° C., 316° C., 329° C., and 343° C., respectively. $M_w$ and $M_n$ were determined by size exclusion chromatography or gel permeation chromatography according to the method described in Example 3. DBEQ was measured via an alkene assay by Wij's titration, in which excess ICl in acetic acid and excess KI are added to a sample of the polymer, and the excess iodine is back-titrated with $Na_2SO_3$. DB/chain is calculated from $M_n$ and DBEQ. In all cases, the amount of DVB reported is active DVB (Aldrich Chemical Co., Milwaukee, Wis., supplies DVB as an 80% solution).

TABLE 1

302° C., 15 minute residence time, 0% initiator

| % DVB | $M_n$ | $M_w$ | PD | DB/chain |
|---|---|---|---|---|
| 0 | 1059 | 1768 | 1.67 | 0.97 |
| 1.6 | 1160 | 2289 | 1.973 | 1.50 |
| 3.2 | 1300 | 3540 | 2.722 | 1.45 |
| 6.4 | 1789 | 111400 | 62.3 | 1.84 |

TABLE 2

316° C., 15 minute residence time, 0% initiator

| % DVB | $M_n$ | $M_w$ | PD | DB/chain |
|---|---|---|---|---|
| 0 | 769 | 1176 | 1.529 | 0.88 |
| 1.6 | 828 | 1397 | 1.687 | |
| 3.2 | 877 | 1684 | 1.919 | 1.24 |
| 4.8 | 944 | 2211 | 2.342 | |
| 6.4 | 1034 | 3135 | 3.033 | 1.51 |
| 8 | 1116 | 4713 | 4.222 | |
| 9.6 | 1277 | 12530 | 9.814 | 1.82 |

TABLE 3

329° C., 15 minute residence time, 0% initiator

| % DVB | $M_n$ | $M_w$ | PD | DB/chain |
|---|---|---|---|---|
| 0 | 602 | 793 | 1.317 | 1.03 |
| 1.6 | 636 | 868 | 1.365 | |
| 3.2 | 658 | 973 | 1.479 | 1.15 |
| 4.8 | 699 | 1131 | 1.618 | |
| 6.4 | 741 | 1314 | 1.774 | 1.38 |
| 8 | 793 | 1592 | 2.008 | |
| 9.6 | 839 | 1889 | 2.253 | 1.50 |
| 11.2 | 916 | 2484 | 2.71 | |
| 12.8 | 1008 | 3523 | 3.494 | 1.95 |
| 14.4 | 1088 | 4977 | 4.573 | |
| 16 | 1181 | 7713 | 6.529 | 2.35 |
| 16 | 1227 | 9488 | 7.733 | 2.2 |
| 17.6 | 1305 | 17180 | 13.17 | 2.5 |
| 19.2 | 1375 | 1.48E + 05 | 107.4 | |

TABLE 4

343° C., 15 minute residence time, 0% initiator

| % DVB | $M_n$ | $M_w$ | PD | DB/chain |
|---|---|---|---|---|
| 0 | 482 | 567 | 1.175 | |
| 8 | 596 | 868 | 1.455 | 0.9 |
| 12 | 686 | 1185 | 1.727 | 1.3 |
| 16 | 802 | 1783 | 2.223 | 1.5 |
| 17.6 | 873 | 2274 | 2.605 | 1.6 |
| 19.2 | 931 | 2797 | 3.005 | 1.7 |
| 20.8 | 1064 | 3943 | 3.706 | 1.9 |
| 22.4 | 1154 | 5584 | 4.84 | 2.2 |
| 24 | 1262 | 8631 | 7.2 | 2.5 |
| 25.8 | 1409 | 18422 | 13.08 | 2.8 |

Figure 2:
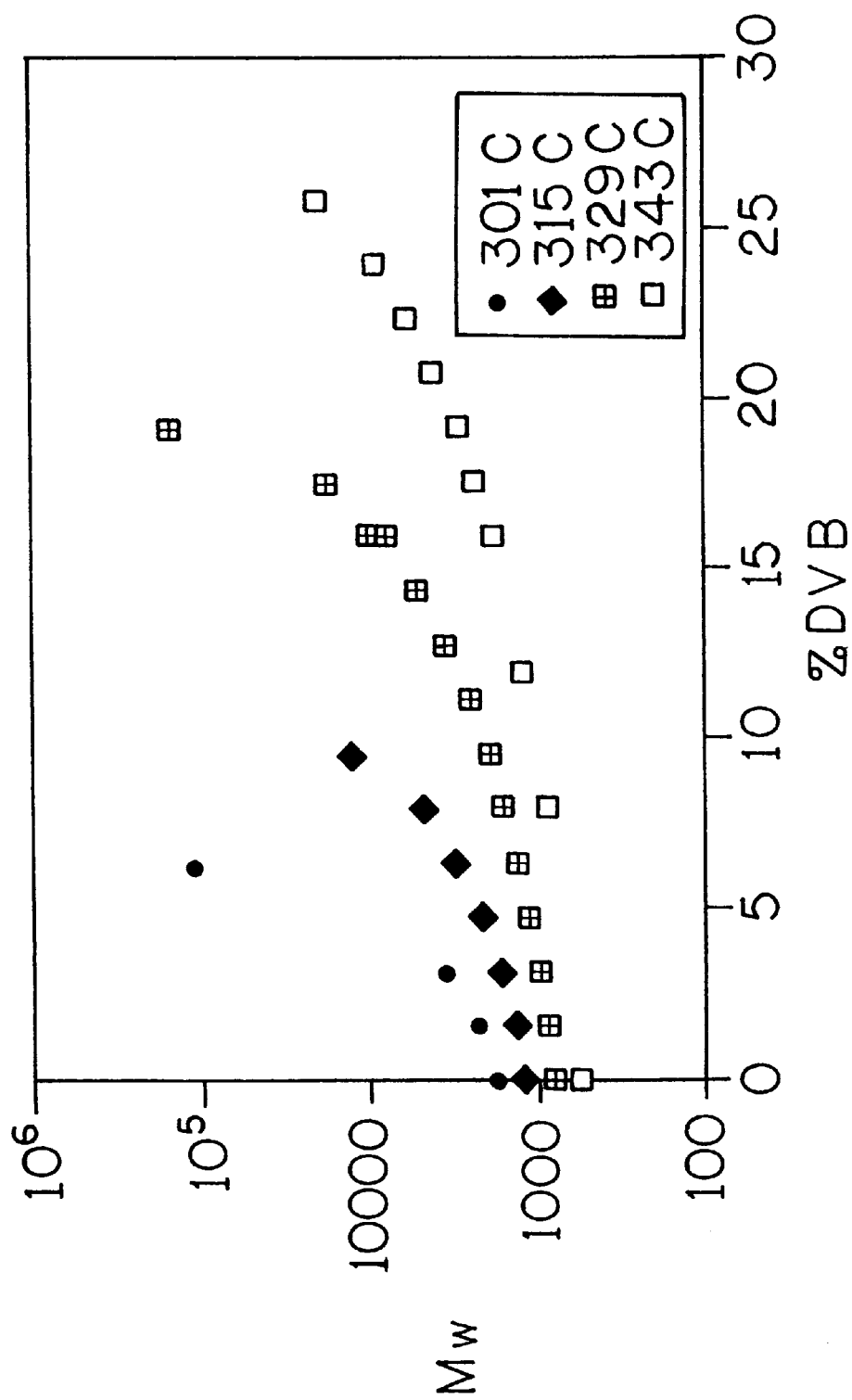
FIG. 2 is a graph illustrating the molecular weight as a function of divinylbenzene monomer content at various reaction temperatures.

The graph of $M_w$ and % DVB data from Tables 1, 2, 3, and 4 shown in FIG. 2 illustrates the change in the effect of % DVB on $M_w$ with changing temperature. At 302° C., $M_w$ increased dramatically when the % DVB increased from 3.2 to 6.4. In contrast, at 329° C. there was only a gradual increase in $M_w$ with increasing % DVB, even up to 16% DVB. This shows that higher temperatures allow inclusion of much higher amounts of DVB in the monomer mixture, providing the desired high degree of branching, but without an undesirable increase in $M_w$ and PD, and thus in viscosity. An increase in $M_w$ and PD typically correlates with formation of insoluble gels.

EXAMPLE 2

Styrene containing various levels of DVB was polymerized at 316° C. using the equipment and techniques described in Example 1, except that the reactor was operated with a 60 minute average reactor residence time, rather than a 15 minute average reactor residence time. The process was kept at a steady state condition for at least 4 residence times before sampling. The number average molecular weight ($M_n$), the weight average molecular weight ($M_w$), the polydispersity (PD), and the DB/chain are displayed in Table 5.

TABLE 5

316° C., 60 minute residence time, 0% initiator

| % DVB | $M_n$ | $M_w$ | PD | DB/chain |
|---|---|---|---|---|
| 0 | 576 | 703 | 1.22 | 1 |
| 1.6 | 566.7 | 732.5 | 1.293 | 0.9 |
| 3.2 | 590.8 | 800.2 | 1.352 | 0.9 |
| 4.8 | 655.9 | 971.2 | 1.481 | 1.08 |

The data in Table 5 show that, at a 60 minute residence time, $M_n$, $M_w$, PD, and DB/chain are all lower than at a 15 minute residence time at the same temperature (Table 2).

EXAMPLE 3

Measurements were made to prove that the polymers were in fact branched. The method employed was gel phase chromatography (GPC) with three detectors: (i) refractive index (RI) for mass concentration; (ii) viscosity for a measurement of intrinsic viscosity; and (iii) laser light scattering for a measurement of the absolute molecular weight. Standard GPC methods separate molecules on the basis of molecular size or hydrodynamic volume. However, a branched molecule has a smaller size when compared to a linear molecule of the same molecular weight, causing GPC to underestimate the molecular weight of branched chains. Details of the method used to generate structural information on the hyperbranched polymers is outlined below.

Samples of linear polystyrene, both narrow molecular weight distribution ($M_w/M_n$ of about 1.3) and broad molecular weight distribution ($M_w/M_n$ of about 2–5), of molecular weight from 1,000 to 15,000,000 Da were prepared by dissolving an amount of the polymer in tetrahydrofuran (THF), containing about 200 ppm of butylated hydroxytoluene (BHT) and about 100 ppm of elemental sulfur as a flow marker, which would provide a concentration of about 4.7−1.2*log(MW) mg/mL, where MW is the molecular weight of the standard polymer sample. Typically, these standard samples were prepared by weighing the subject polymer to the nearest 0.1 mg into a 20 mL glass scintillation vial with a olyethylene-lined screw cap, adding approximately 10–15 mL of THF/BHT/S and re-weighing to determine the amount of solvent. The volume of solution was calculated from knowledge of the density of the solvent at room temperature (0.882 g/mL). Samples of unknown materials were prepared at accurately known concentrations of about 2.5 mg/mL in THF/BHT/S. Typically, the samples consisted of 43 mg of unknown polymer in 17 mL of solvent.

The GPC system consisted of a pump, an autosampler, chromatographic columns and the detector array, including a differential refractometer, a differential viscometer and a light scattering detector. The carrier solvent used was THF with BHT (about 220 ppm) which was managed through a solvent recycling system. Solvent was recycled during the initial 5 minutes of each GPC run which involved returning the solvent to the reservoir as it eluted from the detection array. From 5 minutes to 28 minutes into the run, the eluted solvent was directed to solvent waste. From 28 minutes to the end of the run at 31 minutes, eluted solvent was recycled as described above. The exclusion limit of the GPC columns is about 11.5 minutes; the longest retained material is the elemental sulfur flow marker which elutes at about 24 minutes.

The following chromatographic columns were used: two PLgel mixed bed pore size (resolving range 500 to 10,000,000 Da) 10 micron particle size cross-linked poly(styrene) beads 300×25 mm (product number 1210-6100) chromatographic columns with one PLgel prep guard column (20×25 mm) operated at 40.0° C. A Waters 510 isocratic pump operated at 1.00 mL/min. (about 500 psi-3447 kpa) was used. Sample injection was accomplished with a Waters 717 Autosampler equipped with a 100 yL injection loop. A Waters 410 Differential efractometer thermostated to 40.0° C. was used for in-line detection. The in-line light scattering detector was a Wyatt Technologies miniDAWN equipped for detection at 15, 90, and 135 degrees from the normal. Only the 90 degree detector was utilized in the experiments described here. A Viscotek H50 Differential Viscometer with a Viscotek Data Manager 400 was used for in-line viscosity measurements. The differential pressure was adjusted to zero prior to a series of runs.

The solvent eluting from the column was directed to the light scattering detector. The solvent eluting from the light scattering detector was divided so that half of the volume was directed to the RI detector and the other half to the viscometer.

Figure 3:
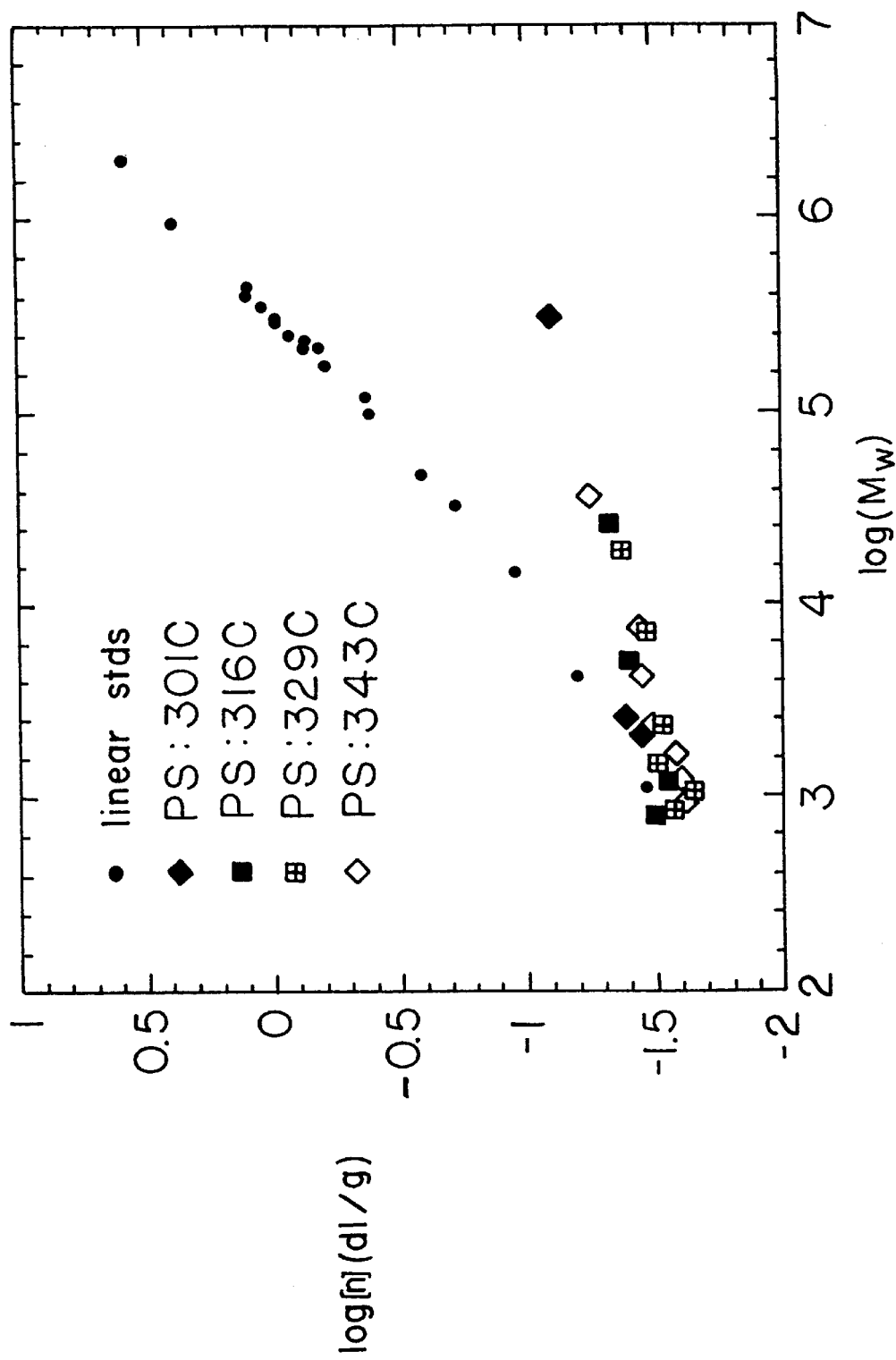
FIG. 3 is a graph illustrating the correlation between the log of intrinsic viscosity and the log of molecular weight.

Data was treated using the Viscotek TriSEC 3.0 GPC software. A calculation method was developed by calibrating the detection array with the 90,000 MW polystyrene linear standard. This calculation method was used to generate intrinsic viscosity and molecular weight values for all the unknown samples. Table 6 and FIG. 3 show the molecular weight values obtained from light scattering ($M_w$), and intrinsic viscosity ($[\eta]$) data, for styrene/DVB polymerizations carried out as described in Example 1. FIG. 3 shows that a plot of log $[\eta]$ against log $M_w$ produces a straight line for a group of linear standards. However, a plot of the data for the hyperbranched polymer samples prepared in Example 1 exhibits deviation from the straight line describing the linear standards. This shows that these polymers have a different intrinsic viscosity/MW relationship, indicating a different molecular structure. This deviation is always in the direction of reduced viscosity at the same MW for the hyperbranched polymers, indicating a more compact structure consistent with their hyperbranched character.

TABLE 6

| Temp. | % DVB | $M_w$ | $[\eta]$ | log $M_w$ | log $[\eta]$ |
|---|---|---|---|---|---|
| 302 | 0.0 | 2020 | 0.0358 | 3.3054 | −1.4461 |
| 302 | 3.2 | 2500 | 0.041 | 3.3979 | −1.3872 |
| 302 | 6.4 | 305000 | 0.0799 | 5.4843 | −1.0975 |
| 316 | 0.0 | 1220 | 0.0286 | 3.0864 | −1.5436 |
| 316 | 3.2 | 780 | 0.0318 | 2.8921 | −1.4976 |
| 316 | 6.4 | 4900 | 0.0401 | 3.6902 | −1.3969 |
| 316 | 9.6 | 25600 | 0.0471 | 4.4082 | −1.3270 |
| 329 | 0.0 | 830 | 0.027 | 2.9191 | −1.5686 |
| 329 | 3.2 | 1050 | 0.0226 | 3.0212 | −1.6459 |
| 329 | 6.4 | 1460 | 0.0313 | 3.1644 | −1.5045 |
| 329 | 9.6 | 2270 | 0.0298 | 3.3560 | −1.5258 |
| 329 | 14.4 | 7100 | 0.0346. | 3.8513 | −1.4609 |
| 329 | 16 | 18700 | 0.0428 | 4.2718 | −1.3686 |
| 343 | 0.0 | 900 | 0.025 | 2.9542 | −1.6021 |
| 343 | 8.0 | 1140 | 0.026 | 3.0569 | −1.5850 |
| 343 | 12.0 | 1580 | 0.0264 | 3.1987 | −1.5784 |
| 343 | 16.0 | 2270 | 0.0337 | 3.3560 | −1.4724 |
| 343 | 19.2 | 4000 | 0.0359 | 3.6021 | −1.4449 |
| 343 | 22.4 | 7360 | 0.0374 | 3.8669 | −1.4271 |
| 343 | 25.8 | 36000 | 0.0574 | 4.5563 | −1.2411 |

EXAMPLE 4

Styrene-Butyl Acrylate Copolymers

Varying amounts of styrene (Sty) and butyl acrylate (BA) were copolymerized along with divinylbenzene using the equipment described in Example 1. The reaction temperature was 329° C. and the residence time was 15 minutes. Percentages of styrene and butyl acrylate were calculated on the basis of weight percent of the total monomers. For this reason, percentages in the runs in which about 10% solvent (AROMATIC 150™, a mixture of aromatics having a flash point of 150° C., available from Exxon Corp., Houston, Tex.) was added total more than 100%. Percentages in the runs without solvent may total less than 100% because the divinylbenzene contained 20% inert material, while the amount of DVB reported in the table is the amount of actual DVB present. The results of these runs are presented in Table 7.

TABLE 7

| %DVB | %Sty | %BA | %Sol | $M_n$ | $M_w$ | PD |
|---|---|---|---|---|---|---|
| 0.00 | 30.00 | 70.00 | 0.00 | 615 | 841 | 1.366 |
| 1.60 | 29.40 | 68.60 | 0.00 | 703 | 1015 | 1.442 |
| 1.60 | 29.40 | 68.60 | 0.00 | 730 | 1009 | 1.38 |
| 3.20 | 28.80 | 67.20 | 0.00 | 788 | 1180 | 1.496 |
| 4.80 | 28.20 | 65.80 | 0.00 | 831 | 1328 | 1.596 |
| 6.40 | 27.60 | 64.40 | 0.00 | 875 | 1485 | 1.695 |
| 8.00 | 27.00 | 63.00 | 0.00 | 954 | 1815 | 1.9 |
| 5.87 | 27.78 | 64.89 | 10.00 | 820 | 1620 | 1.977 |
| 9.80 | 26.28 | 61.47 | 10.02 | 653 | 1900 | 1.995 |
| 11.02 | 25.78 | 60.44 | 10.00 | 1013 | 2230 | 2.202 |
| 14.40 | 24.60 | 57.40 | 10.00 | 1075 | 2615 | 2.433 |
| 16.00 | 24.00 | 56.00 | 10.00 | 1100 | 2885 | 2.606 |
| 14.40 | 24.67 | 57.33 | 10.00 | 1142 | 3393 | 2.971 |
| 15.47 | 24.22 | 56.44 | 10.00 | 1227 | 4241 | 3.455 |
| 16.53 | 23.78 | 55.56 | 10.00 | 1293 | 5414 | 4.187 |
| 17.46 | 23.39 | 54.79 | 10.02 | 1410 | 6937 | 4.921 |
| 18.49 | 23.11 | 53.78 | 10.00 | 1427 | 9136 | 6.405 |
| 19.41 | 22.78 | 52.96 | 10.00 | 1649 | 11410 | 6.92 |
| 20.27 | 22.44 | 52.22 | 10.00 | 1779 | 20180 | 11.34 |
| 21.16 | 22.00 | 51.56 | 10.00 | 1928 | 49650 | 25.75 |
| 22.04 | 21.78 | 50.67 | 10.00 | 2024 | 2.14E+05 | 105.6 |
| 22.93 | 21.33 | 50.00 | 10.00 | 1665 | 1.14E+05 | 68.26 |

These data show that mixtures of BA, styrene and DVB reach a point where $M_w$ and PD increase rapidly, but only at very high levels of DVB. This increase typically correlates with the formation of insoluble gels. After formation of gel molecules, the molecular weight decreases with increasing DVB, as seen in Table 7 when the DVB content increases from 22.04% to 22.93%. This decrease in molecular weight is believed to be due to preferential reaction of the gel molecules with the larger soluble molecules.

EXAMPLE 5

Styrene-Hydroxyethyl Methacrylate Copolymers

Varying amounts of styrene and hydroxyethyl methacrylate (HEMA) were copolymerized along with divinylbenzene according to the conditions described in Example 4. The results of these polymerizations are presented in Table 8. Polymerizations of these monomers were also carried out in the presence of di-tert-butyl peroxide (DTBP). The results of these polymerizations are presented in Table 9.

TABLE 8

| % DVB | % Sty | % HEMA | $M_n$ | $M_w$ | PD |
|---|---|---|---|---|---|
| 1.60 | 29.43 | 68.58 | 664 | 956 | 1.44 |
| 0.00 | 30.00 | 70.00 | 650 | 906 | 1.393 |
| 3.01 | 28.82 | 67.42 | 713 | 1118 | 1.569 |
| 4.48 | 28.40 | 66.00 | 752 | 1273 | 1.692 |
| 6.40 | 27.60 | 64.40 | 781 | 1426 | 1.827 |
| 8.00 | 27.00 | 63.00 | 830 | 1663 | 2.005 |
| 9.60 | 26.40 | 61.60 | 890 | 2012 | 2.257 |
| 11.20 | 25.80 | 60.20 | 1127 | 4384 | 3.891 |
| 12.80 | 25.20 | 58.80 | 1026 | 3093 | 3.018 |
| 16.00 | 24.00 | 56.00 | 1075 | 4054 | 3.773 |
| 17.60 | 23.40 | 54.60 | 1114 | 6284 | 5.643 |
| 14.40 | 24.60 | 57.40 | 1075 | 3404 | 3.168 |
| 19.20 | 22.80 | 53.20 | 1338 | 10840 | 8.098 |
| 20.80 | 22.20 | 51.80 | 1479 | 27930 | 18.52 |
| 22.40 | 21.60 | 50.40 | 1564 | 1.37 + 05 | 87.6 |

TABLE 9

| % DVB | % Sty | % HEMA | % DTBP | $M_n$ | $M_w$ | PD |
|---|---|---|---|---|---|---|
| 0.0 | 29.89 | 69.75 | 0.36 | 615 | 845 | 1.374 |
| 1.60 | 29.31 | 68.38 | 0.36 | 664 | 993 | 1.496 |
| 4.51 | 28.20 | 65.80 | 0.36 | 755 | 1400 | 1.855 |

EXAMPLE 6

Butyl Acrylate-Hydroxyethylmethacrylate Copolymers

Varying amounts of butyl acrylate and hydroxyethyl methacrylate were copolymerized along with divinylbenzene and di-tert-butyl peroxide (DTBP) according to the conditions described in Example 4. The results of these experiments are presented in Table 10.

TABLE 10

| % DVB | % BA | % HEMA | % DTBP | $M_n$ | $M_w$ | PD |
|---|---|---|---|---|---|---|
| 0.0 | 49.8 | 49.8 | 0.4 | 1033 | 2250 | 2.18 |
| 2.0 | 48.7 | 48.7 | 0.6 | 1170 | 3557 | 3.04 |
| 3.9 | 47.75 | 47.75 | 0.6 | 1220 | 4341 | 3.56 |
| 5.6 | 46.9 | 46.9 | 0.6 | 1275 | 5040 | 3.96 |
| 7.4 | 46.0 | 46.0 | 0.6 | 1370 | 6680 | 4.9 |
| 9.2 | 45.2 | 45.2 | 0.6 | 1450 | 7150 | 4.9 |

COMPARATIVE EXAMPLE 1

Ampoule (Batch) Polymerizations

Polymerization reactions carried out in ampoules are generally accepted as simulations of polymerization reactions carried out in batch reactors.

Stock solutions of styrene and divinylbenzene (mixture of isomers) were prepared with styrene/divinylbenzene ratios ranging from 1.00 to 4.00 and stored in 15 mL glass scintillation vials with screw caps protected with polyethylene cap inserts. Approximately one mL of monomer mixture was charged into individual tubes prepared from 5.0 mm O.D., 3.5 mm I.D., 250 mm (length) Pyrex glass tubing and sealed into a round bottom at one end. The monomer mixture was added to the tube to about 125 mm from the bottom of the tube. The tubes and monomer contents were subjected to freeze-pump-thaw cycles to degas the mixtures which involved attaching the filled tube to a vacuum line, freezing the contents with liquid nitrogen and exposing the frozen contents to high vacuum for one minute. The vacuum was removed and the tube was allowed to warm to room temperature under a nitrogen blanket. The monomer mixture degassed while the frozen monomer melted. The process was repeated for a total of two freeze-pump-thaw degassing cycles. The tube and contents were frozen in liquid nitrogen, and while frozen, the contents were evacuated at high vacuum, and the tube was sealed by a torch, leaving about 80 mm of headspace above the liquid column. The tubes and frozen monomer contents were allowed to thaw to room temperature.

Individual tubes were identified by a permanent marker and rapidly submerged into a stirred silicone oil bath thermostated to 318+/-2° C. or 308+/-2° C. The tubes were allowed to remain in the oil bath for 10.0 minutes, at which time they were rapidly removed with forceps and immediately plunged into an ice/water bath.

The exterior of each ampoule was cleaned with acetone and THF, the ampoule was frozen in liquid nitrogen, and while the contents were frozen, the tubes were scored with a glass marker into approximately 1 cm segments, and broken open using pliers and the pieces were immediately dropped into a labeled 15 mL glass scintillation vial containing 10 mL THF. The vial and contents were capped and the contents were allowed to stand with occasional swirling for 24 hours. At the end of this time, a 5 mL aliquot of this mixture was removed, filtered through a 0.2 micron Teflon syringe-end filter and analyzed by GPC with RI, viscometry, and light scattering (633 nm, 90 degree angle) detection. The results of experiments carried out at 308° C. and 318° C. are presented in Tables 11 and 12, respectively.

TABLE 11

Ampoule Polymerization at 308° C.

| % Sty | % DVB | $M_w$ | PD | Gel? |
|---|---|---|---|---|
| 100 | 0.0 | | | no |
| 97.9 | 2.1 | 74410 | 38.10 | yes |
| 97.2 | 2.8 | 143300 | 76.74 | yes |
| 97.0 | 3.0 | 111400 | 63.98 | yes |
| 96.4 | 3.6 | 103600 | 67.80 | yes |
| 96.0 | 4.0 | 12010 | 8.926 | yes |
| 93.8 | 6.2 | 6020 | 5.642 | yes |
| 90.0 | 10.0 | 39090 | 51.00 | yes |

TABLE 12

Ampoule Polymerization at 318° C.

| % Sty | % DVB | $M_w$ | PD | Gel? |
|---|---|---|---|---|
| 100 | 0.0 | 7597 | 5.342 | no |
| 97.9 | 2.1 | 40050 | 26.17 | no |

TABLE 12-continued

Ampoule Polymerization at 318° C.

| % Sty | % DVB | $M_w$ | PD | Gel? |
|---|---|---|---|---|
| 97.2 | 2.8 | 49800 | 32.00 | no |
| 97.0 | 3.0 | 49740 | 31.63 | yes |
| 96.4 | 3.6 | 140800 | 88.17 | yes |
| 96.0 | 4.0 | 185300 | 129.20 | yes |
| 93.8 | 6.2 | 6773 | 6.932 | yes |
| 90.0 | 10.0 | 2385 | 3.210 | yes |
| 80.0 | 20.0 | 1027 | 1.807 | yes |

At the higher temperature employed in the experiments summarized in Table 12, gel formation occurs at higher levels of DVB. However, gel formation in ampoules occurs more easily, that is, at much lower levels than in the CSTR polymerization of styrene reported in Example 1. This behavior is opposite to that reported in the literature.

Other variations and modifications of this invention will be obvious to those skilled in the art. This invention is not limited except as set forth in the claims.

What is claimed is:

1. A hyperbranched polymer comprising from 12% to about 30% of repeat units derived from divinylic monomers, about 50 to about 88% by weight of repeat units derived from monoethylenically unsaturated monomers and having a polydispersity of less than about 20 and a number average molecular weight of from about 300 to about 10,000, wherein from 10% to about 15% by weight of the repeat units is derived from divinylbenzene.

2. The hyperbranched polymer according to claim 1, wherein the divinylic monomers consist of divinylbenzene.

3. The hyperbranched polymer according to claim 1, wherein the divinylic monomers are selected from the group consisting of divinylbenzene, bis-(4-ethenylphenyl) methane, divinyldioxane, divinyl ether, 1,4-butanediol divinyl ether, hexanediol divinyl ether, cyclohexanediol divinyl ether, ethylene glycol divinyl ether, diethylene glycol divinyl ether, cyclohexanedimethanol divinyl ether, 1,3divinyl-1,1,3,3-tetramethyldisilazane, divinyl 1,3-diphenyl-1,3-dimethyldisilazane, divinyl tetraethoxy-1,3-disilazane, divinyl tetramethoxy-1,3-disilazane, divinyl 1,3-phenyl-1,3-dimethyl-1,3disiloxane, divinylacetylene, N,N-divinylaniline, divinylcarbinol, divinylcarbonate, 1,2-divinylcyclobutane, cis-1,2-divinylcyclohexane, trans-1,2-divinylcyclohexane, 1,4-divinylcyclohexanedimethanol diether, divinyldibutyltin, 2,5-divinyldioxane, 1,1'-divinylferrocene, divinylformal, divinyl glycol, 1,4-divinylperfluorobutane, 1,6divinylperfluorohexane, divinylphenylphosphine, 3,9-divinylspirobim-dioxane, divinylsulfone, 1,4-divinyl-1,1,4,4-tetramethyldisilylethylene, divinyl tin dichloride, divinyl triethylene glycol diether, 1,5-bis-divinyloxy-3-oxapentane, divinylsilane, divinyldiethoxysilane, divinyldimethylsilane, divinyldiphenylsilane, 1,1'-bis(2-vinyloxyethoxy)-4,4'-isopropylidene diphenol, ethylene glycol dimethacrylate, bisphenol A dimethacrylate, bisphenol A 2-hydroxyethyl dimethacrylate, 1,3-butylene glycol dimethacrylate, 1,4-butanediol dimethacrylate, butenediol dimethacrylate, 2-butyl-2-ethyl-1,3-propanediol dimethacrylate, 2-butyne-1,4-diyl dimethacrylate, 1,4-cyclohexanediol dimethacrylate, decamethylene glycol dimethacrylate, diethylene glycol dimethacrylate, 2,3-dihydroxypropyl dimethacrylate, 1,6-dimethylhexanediol dimethacrylate, 2,5-dimethylhexanediol dimethacrylate, dipropylene glycol dimethacrylate, diurethane dimethacrylate, 1,12-dodecanediol dimethacrylate, ethylidene dimethacrylate, glycerol dimethacrylate, 1,5-tetrahydroperfluoropentyl dimethacrylate, hexafluorobisphenol A dimethacrylate, hexylene glycol dimethacrylate, hydrogenated bisphenol A dimethacrylate, methylene glycol dimethacrylate, neopentyl glycol dimethacrylate, 2,2,3,3,4,4,5,5-octafluorohexanediol 1,6-dimethacrylate, pentaerythritol dimethacrylate, 1,5-pentanediol dimethacrylate, perfluorocyclohexyl 1,4dimethyl dimethacrylate, o-phenylene dimethacrylate, p-phenylene dimethacrylate, styrene glycol dimethacrylate, polyethylene glycol 600 dimethacrylate, polyethylene glycol 400 dimethacrylate, 1,2-propylene glycol dimethacrylate, propylene glycol dimethacrylate, sorbitol dimethacrylate, 4,4'-sulfonyl diphenol dimethacrylate, tetrabromo bisphenol A dimethacrylate, tetrachloro bisphenol A dimethacrylate, tetraethylene glycol dimethacrylate, 2,2,3,3-tetrafluorobutanediol dimethacrylate, triethylene glycol dimethacrylate, trimethyl pentanediol dimethacrylate, urethane dimethacrylate, zinc dimethacrylate, zirconium(IV) dimethacrylate, butanediol diacrylate, N,N-diacryloyl acrylamide, bisphenol A diacrylate, bisphenol A 2-hydroxyethyl diacrylate, 1,3-butylene glycol diacrylate, 1,4-butanediol diacrylate, 1,10decanediol diacrylate, propoxylated neopentyl glycol diacrylate, ethoxylated bisphenol A diacrylate and dimethacrylate, ethylene glycol dimethacrylate, tetraethylene glycol diacrylate, tripropylene glycol dimethacrylate, diethyl 1,3-propanediol diacrylate, diethylene glycol diacrylate, dimethyl bisphenol A diacrylate, dipropylene glycol diacrylate, ethyl 1,3-hexanediol diacrylate, ethylene diacrylate, ethylidene diacrylate, hexafluorobisphenol A diacrylate, 1,6-hexanediol diacrylate, 2,5-hexanediol diacrylate, neopentyl glycol diacrylate, propoxylated neopentyl glycol diacrylate, 1,9-nonamethylene diacrylate, 2,2,3,3,4,4,5,5-octafluorohexanediol 1,$^6$-diacrylate, 1,5-pentanediol diacrylate, p-phenylene diacrylate, polyethylene glycol 400 diacrylate, 1,2-propylene glycol diacrylate, propylene glycol diacrylate, sorbitol diacrylate, tetrabromobisphenol A diacrylate, polyethylene glycol 200 diacrylate, 2,2,3,3-tetrafluorobutanediol diacrylate, thiol diethylene glycol diacrylate, triethylene glycol diacrylate, tripropylene glycol diacrylate, urethane diacrylate, zinc diacrylate, diethylene glycol diacryloxypropionate, bis-acryloyl piperazine, diallyl maleate, and mixtures thereof.

4. The hyperbranched polymer according to claim 1, wherein the repeat units derived from monoethylenically unsaturated monomers are derived from styrene or a mixture of styrene and at least a second monoethylenically unsaturated monomer.

5. The hyperbranched polymer according to claim 4, wherein the second monoethylenically unsaturated monomer is selected from the group consisting of α-methylstyrene, acrylic acid, methacrylic acid, methyl methacrylate, butyl acrylate, butyl methacrylate, hydroxyethyl methacrylate, hydroxypropyl methacrylate, and hydroxypropyl acrylate.

6. A hyperbranched polymer comprising at least about 3% by weight of repeat units derived from divinylic monomers, about 50 to about 97% by weight of repeat units derived from monoethylenically unsaturated monomers and having a polydispersity of less than about 20 and a number average molecular weight of from about 300 to about 10,000, further comprising repeat units derived from tri- or greater ethylenically unsaturated monomers.

7. The hyperbranched polymer according to claim 6, wherein at least 6% by weight of the repeat units is derived from divinylic monomers.

8. The hyperbranched polymer according to claim 6, wherein from 12% to about 30% by weight of the repeat units is derived from divinylic monomers.

9. The hyperbranched polymer according to claim 6, wherein the divinylic monomers comprise divinylbenzene.

10. The hyperbranched polymer according to claim 6, wherein the tri- or greater ethylenically unsaturated monomers are selected from the group consisting of triethylenically unsaturated monomers and tetraethylenically unsaturated monomers.

11. The hyperbranched polymer according to claim 6, wherein the tri- or greater ethylenically unsaturated monomers are selected from the group consisting of triacrylformal, pentaerythritol triallyl esters, glyceryl propoxy triacrylate, ferric triacrylate, pentaerythritol triacrylate, triazine-2,4,6-triyl-1,2-ethanediyl triacrylate, trimethylol ethane triacrylate, trimethylol propane triacrylate, ethoxylated trimethylol ethane triacrylate, ethoxylated trimethylol propane triacrylate, glycerol trimethacrylate, proproxylated glycerol triacrylate, pentaerythritol trimethacrylate, 1,2,5-pentanetriol trimethacrylate, triethanolamine trimethacrylate, trimethylol ethane trimethacrylate, trimethylol propane trimethacrylate, tris(2-hydroxyethyl) isocyanurate trimethacrylate, pentaerythritol tetraacrylate, zirconium(IV) tetraacrylate, pentaerythritol tetramethacrylate, zirconium(IV) tetramethacrylate, and mixtures thereof.

12. The hyperbranched polymer according to claim 6, wherein the divinylic monomers are selected from the group consisting of divinylbenzene, bis-(4-ethenylphenyl) methane, divinyldioxane, divinyl ether, 1,4-butanediol divinyl ether, hexanediol divinyl ether, cyclohexanediol divinyl ether, ethylene glycol divinyl ether, diethylene glycol divinyl ether, cyclohexanedimethanol divinyl ether, 1,3-divinyl-1,1,3,3-tetramethyldisilazane, divinyl 1,3-diphenyl-1,3-dimethyldisilazane, divinyl tetraethoxy-1,3-disilazane, divinyl tetramethoxy-1,3-disilazane, divinyl 1,3-diphenyl-1,3-dimethyl-1,3-disiloxane, divinylacetylene, N,N-divinylaniline, divinylcarbinol, divinylcarbonate, 1,2-divinylcyclobutane, cis-1,2-divinylcyclohexane, trans-1,2-divinylcyclohexane, 1,4-divinylcyclohexanedimethanol diether, divinyldibutyltin, 2,5-divinyldioxane, 1,1'-divinylferrocene, divinylformal, divinyl glycol, 1,4-divinylperfluorobutane, 1,6-divinylperfluorohexane, divinylphenylphosphine, 3,9-divinylspirobim-dioxane, divinylsulfone, 1,4-divinyl-1,1,4,4-tetramethyldisilylethylene, divinyl tin dichloride, divinyl triethylene glycol diether, 1,5-bis-divinyloxy-3-oxapentane, divinylsilane, divinyldiethoxysilane, divinyldimethylsilane, divinyldiphenylsilane, 1,1'-bis(2-vinyloxyethoxy)-4,4'-isopropylidene diphenol, ethylene glycol dimethacrylate, bisphenol A dimethacrylate, bisphenol A 2-hydroxyethyl dimethacrylate, 1,3-butylene glycol dimethacrylate, 1,4-butanediol dimethacrylate, butenediol dimethacrylate, 2-butyl-2-ethyl-1,3-propanediol dimethacrylate, 2-butyne-1,4-diyl dimethacrylate, 1,4-cyclohexanediol dimethacrylate, decamethylene glycol dimethacrylate, diethylene glycol dimethacrylate, 2,3dihydroxypropyl dimethacrylate, 1,6-dimethylhexanediol dimethacrylate, 2,5dimethylhexanediol dimethacrylate, dipropylene glycol dimethacrylate, diurethane dimethacrylate, 1,12-dodecanediol dimethacrylate, ethylidene dimethacrylate, glycerol dimethacrylate, 1,5-tetrahydroperfluoropentyl dimethacrylate, hexafluorobisphenol A dimethacrylate, hexylene glycol dimethacrylate, hydrogenated bisphenol A dimethacrylate, methylene glycol dimethacrylate, neopentyl glycol dimethacrylate, 2,2,3,3,4,4,5,5-octafluorohexanediol 1,6-dimethacrylate, pentaerythritol dimethacrylate, 1,5-pentanediol dimethacrylate, perfluorocyclohexyl 1,4-dimethyl dimethacrylate, o-phenylene dimethacrylate, p-phenylene dimethacrylate, styrene glycol dimethacrylate, polyethylene glycol 600 dimethacrylate, polyethylene glycol 400 dimethacrylate, 1,2-propylene glycol dimethacrylate, propylene glycol dimethacrylate, sorbitol dimethacrylate, 4,4'-sulfonyl diphenol dimethacrylate, tetrabromo bisphenol A dimethacrylate, tetrachloro bisphenol A dimethacrylate, tetraethylene glycol dimethacrylate, 2,2,3,3-tetrafluorobutanediol dimethacrylate, triethylene glycol dimethacrylate, trimethyl pentanediol dimethacrylate, urethane dimethacrylate, zinc dimethacrylate, zirconium(IV) dimethacrylate, butanediol diacrylate, N,N-diacryloyl acrylamide, bisphenol A diacrylate, bisphenol A 2-hydroxyethyl diacrylate, 1,3-butylene glycol diacrylate, 1,4-butanediol diacrylate, 1,10decanediol diacrylate, propoxylated neopentyl glycol diacrylate, ethoxylated bisphenol A diacrylate and dimethacrylate, ethylene glycol dimethacrylate, tetraethylene glycol diacrylate, tri-propylene glycol dimethacrylate, diethyl 1,3-propanediol diacrylate, diethylene glycol diacrylate, dimethyl bisphenol A diacrylate, dipropylene glycol diacrylate, ethyl 1,3-hexanediol diacrylate, ethylene diacrylate, ethylidene diacrylate, hexafluorobisphenol A diacrylate, 1,6hexanediol diacrylate, 2,5-hexanediol diacrylate, neopentyl glycol diacrylate, propoxylated neopentyl glycol diacrylate, 1,9-nonamethylene diacrylate, 2,2,3,3,4,4,5,5 octafluorohexanediol 1,6diacrylate, 1,5-pentanediol diacrylate, p-phenylene diacrylate, polyethylene glycol 400 diacrylate, 1,2-propylene glycol diacrylate, propylene glycol diacrylate, sorbitol diacrylate, tetrabromo-bisphenol A diacrylate, polyethylene glycol 200 diacrylate, 2,2,3,3-tetrafluorobutanediol diacrylate, thiol diethylene glycol diacrylate, triethylene glycol diacrylate, tripropylene glycol diacrylate, urethane diacrylate, zinc diacrylate, diethylene glycol diacryloxypropionate, bis-acryloyl piperazine, diallyl maleate, and mixtures thereof.

13. The hyperbranched polymer according to claim 6, wherein the repeat units derived from monoethylenically unsaturated monomers are derived from styrene or a mixture of styrene and at least a second monoethylenically unsaturated monomer.

14. The hyperbranched polymer according to claim 13, wherein the second monoethylenically unsaturated monomer is selected from the group consisting of α-methylstyrene, acrylic acid, methacrylic acid, methyl methacrylate, butyl acrylate, butyl methacrylate, hydroxyethyl methacrylate, hydroxypropyl methacrylate, and hydroxypropyl acrylate.

15. The hyperbranched polymer according to claim 13, wherein the second monoethylenically unsaturated monomer comprises butyl acrylate.

16. The hyperbranched polymer according to claim 13, wherein the second monoethylenically unsaturated monomer comprises hydroxyethyl methacrylate.

17. A hyperbranched polymer comprising at least about 3% by weight of repeat units derived from divinylic monomers, about 50 to about 97% by weight of repeat units derived from monoethylenically unsaturated monomers and having a polydispersity of less than about 20 and a number average molecular weight of from about 300 to about 10,000, wherein the monoethylenically unsaturated monomer comprises a mixture of butyl acrylate and hydroxyethyl methacrylate.

18. The hyperbranched polymer according to claim 17, wherein the divinylic monomers comprise divinyl benzene.

* * * * *

UNITED STATES PATENT AND TRADEMARK OFFICE
CERTIFICATE OF CORRECTION

PATENT NO. : 6,265,511 B1
DATED : July 24, 2001
INVENTOR(S) : Campbell et al.

It is certified that error appears in the above-identified patent and that said Letters Patent is hereby corrected as shown below:

Column 3,
Line 1, delete "diniethacrylate, insert -- dimethylacrylate --.

Column 7,
Line 22, delete "methyl-i-pentanol", insert -- methyl-1-pentanol --.

Column 11,
Line 32, delete "efractometer", insert -- Refractometer --.

Column 13,
Line 33, (last row of Table 8), delete 1.37 + 05 insert -- 1.37E + 05 --.

Column 15,
Line 43, delete "1,3-phenyl", insert 1,3-diphenyl --.

Column 16,
Line 23, after the number "10", insert a hyphen -- - --.
Line 35, delete "$^6$", insert -- 6 --.

Column 18,
Line 27, delete "6 diacrylate", insert -- 6-diacrylate --.

Signed and Sealed this

Fourth Day of June, 2002

Attest:

JAMES E. ROGAN
Attesting Officer        Director of the United States Patent and Trademark Office